(12) United States Patent
Cherabuddi et al.

(10) Patent No.: US 6,256,729 B1
(45) Date of Patent: Jul. 3, 2001

(54) METHOD AND APPARATUS FOR RESOLVING MULTIPLE BRANCHES

(75) Inventors: Rajasekhar Cherabuddi, Sunnyvale; Sanjay Patel, Fremont; Adam R. Talcott, San Jose; Ramesh K. Panwar, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/004,971

(22) Filed: Jan. 9, 1998

(Under 37 CFR 1.47)

(51) Int. Cl.[7] .................................................. G06F 15/00
(52) U.S. Cl. ............................................................ 712/238
(58) Field of Search ..................................... 712/233–240

(56) References Cited

U.S. PATENT DOCUMENTS 5,805,876 * 9/1998 Bose et al. ......................... 395/581
5,944,817 * 8/1999 Hoyt et al. ......................... 712/240

OTHER PUBLICATIONS

Mike Johnson, *Superscalar Microprocessor Design*, Prentice Hall, 1991, p. 133, 1991.*

* cited by examiner

*Primary Examiner*—John A. Follansbee
(74) *Attorney, Agent, or Firm*—Townsend and Townsend and Crew LLP

(57) ABSTRACT

A method for repairing a pipeline in response to a branch instruction having a branch, includes the steps of providing a branch repair table having a plurality of entries, allocating an entry in the branch repair table for the branch instruction, storing a target address, a fall-through address, and repair information in the entry in the branch repair table, processing the branch instruction to determine whether the branch was taken, and repairing the pipeline in response to the repair information and the fall-through address in the entry in the branch repair table when the branch was not taken.

20 Claims, 5 Drawing Sheets

METHOD AND APPARATUS FOR RESOLVING MULTIPLE BRANCHES

TRADEMARK NOTICE

Sun, Spring, Solaris, Sunsoft, and SunOS are trademarks or registered trademarks of Sun Microsystems, Inc. in the United States and other countries. All SPARC trademarks are used under license and are trademarks or registered trademarks of SPARC International, Inc. in the United States of America and other countries. Products bearing SPARC trademarks are based upon an architecture developed by Sun Microsystems, Inc.

BACKGROUND OF THE INVENTION

The present invention relates to out-of-order instruction execution. In particular, the present invention relates to branch instructions that are executed out-of-order and to resolving mispredicted branches.

A commonly used technique for increasing pipelined microprocessor performance has been to execute instructions in an order other than a sequential order, i.e. out-of-order. Typically, pipelined processors supporting out-of-order instruction execution include instruction scheduling units that decide which instructions to execute and in which order such instructions are executed.

When branch instructions are included, instruction fetch units typically include branch prediction units. Branch instructions typically include two addresses, a target address (TA) and a fall-through address (FA). A processor is instructed to jump to the TA for the next instruction to be executed when a branch is taken, and the processor is instructed to jump to the FA, which is typically the next sequential address in the program order, for the next instruction to be executed when the branch is not taken. Typically, branch prediction units predict whether branches are taken or not taken and/or predict a TA for the branches.

Problems arise with out-of-order execution schemes when branch instructions are included. For example, typically only upon completion of execution and pending retirement of a branch instruction is the processor able to determine a direction, whether a branch was taken or not taken. Only after the actual directions are determined or actual TAs are determined can the processor determine whether the branch predictions were correct. If the branch prediction was incorrect, i.e. a branch was taken that should not have been taken, the predicted TA is not the same as the actual TA, etc, then the pipeline will typically be stopped, the instructions issued after the branch instruction flushed from the pipeline, and the processor restarted according to the actual branch result. Because a typical processor must wait until the branch instruction is actually executed and awaiting retirement, before the instruction at the new TA can be fetched, many processing cycles are wasted.

Other drawbacks with typical pipelined processors that support branch predictions are that large amounts of data must be stored in order to allow for the processor to restart properly. Typically, all instructions including branch instructions being processed in the pipeline are stored in a "central instruction window" in a single memory. However, branch instructions require the storage of different data than conventional instructions and thus require the central instruction window to be increased in word size (bits) to store the branch instruction specific data. Further, with the additional storage of branch instructions, execution units require additional parsing logic to decode the additional fields and data. Thus, storage of branch instruction related data requires a great increase in memory size and logic.

The above problem is greatly magnified as the depth of the central instruction window increases, i.e. the number of instructions in an instruction pipeline increases. Another drawback is that typical pipeline processors have great difficulty resolving more than one branch instruction per clock cycle.

What is needed are improved methods and apparatus for resolving multiple branches that are executed out-of-order and resolving mis-predicted branches.

SUMMARY OF THE INVENTION

The present invention discloses methods and apparatus for enhanced resolution of mispredicted branches by providing and utilizing a branch repair table.

According to a preferred embodiment of the present invention, a branch repair table including a plurality of entries for a processor is disclosed. An entry of the first plurality of entries in the branch repair table includes a first portion for storing a branch identifier, a second portion for storing a fall-through address associated with a branch instruction, and a third portion for storing a target address associated with the branch instruction.

According to another embodiment a microprocessor for executing instructions out of order includes a branch repair table for storing data related to branch instructions, the branch repair table including a first plurality of entries, at least one entry of the first plurality of entries having a first portion for storing a target address of a branch instruction and a second portion for storing a fall-through address for the branch instruction. The microprocessor also includes a pipelined execution unit having an associated central instruction window, the central instruction window including a second plurality of entries for storing instructions including the branch instructions and a reference to at least the one entry in the first plurality of entries, the second plurality of entries less than the first plurality of entries.

According to yet another embodiment of the present invention, a method for repairing a pipeline in response to a branch instruction includes the steps of providing a branch repair table having a plurality of entries, predicting a target address for the branch instruction, allocating an entry in the branch repair table for the branch instruction, and storing the predicted target address, fall-through address, and repair information in the entry in the branch repair table. The steps of processing the branch instruction to determine an actual target address, comparing the predicted target address to the actual target address, and repairing the pipeline in response to the repair information in the entry in the branch repair table in response to the predicted target address and the actual target address being different, are also included.

Further understanding of the nature and advantages of the invention may be realized by reference to the remaining portions of the specification and drawings.

DESCRIPTION OF SPECIFIC EMBODIMENTS

Figure 1:
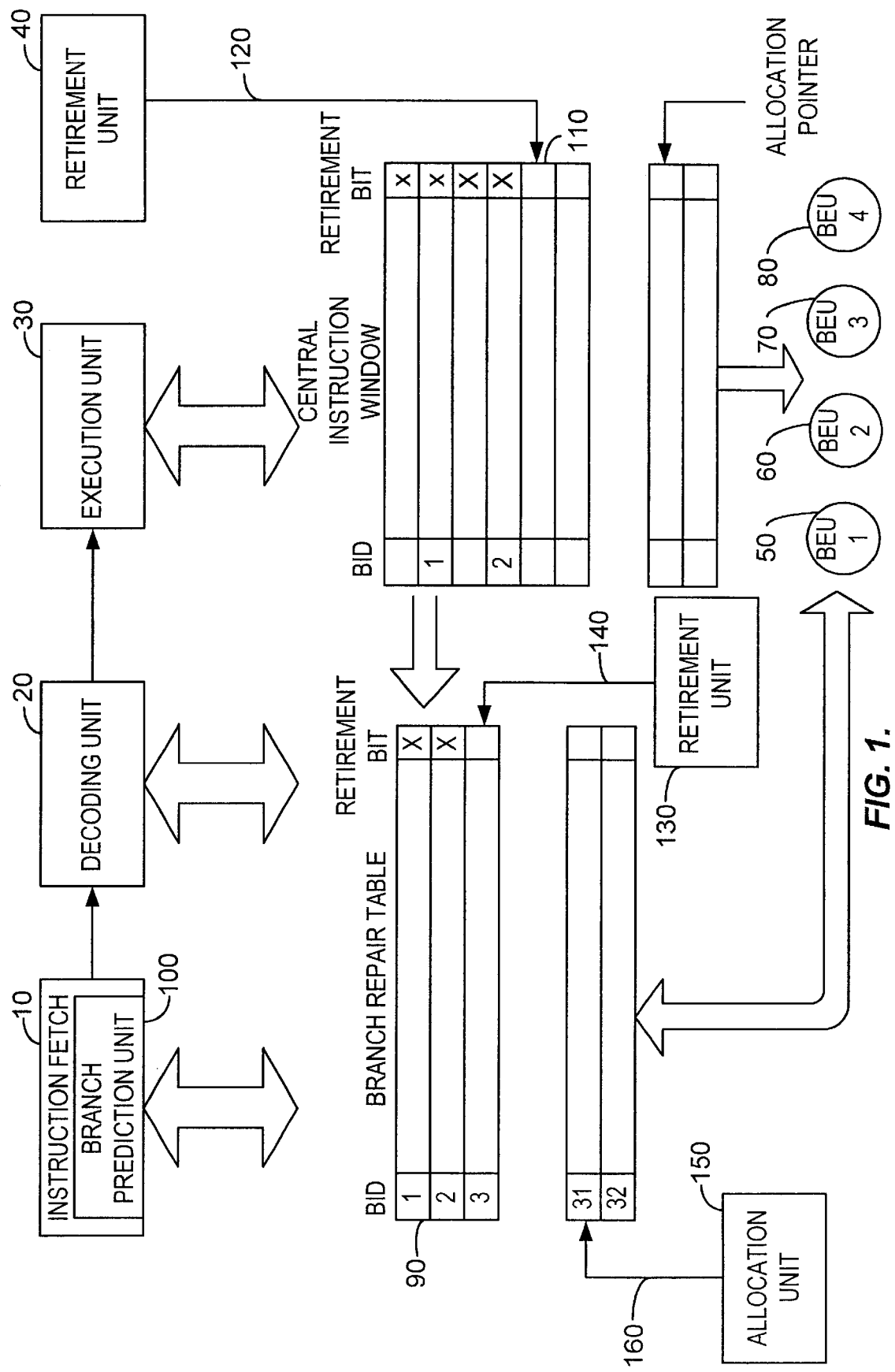
FIG. 1 illustrates a block diagram of a processor incorporating an embodiment of the present invention.

FIG. 1 illustrates a block diagram of a processor incorporating an embodiment of the present invention. FIG. 1 includes an instruction fetch unit 10, an instruction decoding unit 20, an execution unit 30, a retirement unit 40, branch execution units (BEUs) 50–80, and a branch repair table (BRT) 90. Instruction fetch unit 10 includes a branch prediction unit (BPU) 100. Execution unit 30 has an associated central instruction window (CIW) 110. Retirement unit 40 provides a retirement pointer 120. Branch repair table (BRT) 90 has an associated retirement unit 130 providing a retirement pointer 140 and an associated allocation unit 150 providing an allocation pointer 160.

As is illustrated in FIG. 1, instruction fetch unit 10 is coupled to decoding unit 20 which in turn is coupled to execution unit 30. CIW 110 is referenced by retirement pointer 120 and coupled to BEUs 50–80 and BRT 90. BRT 90 is coupled to instruction fetch unit 10 and instruction decoding unit 20.

Instruction fetch unit 10 fetches instructions from a memory for execution by execution unit 30. These instructions are preferably fetched in a sequential order and preferably executed in an order other than a sequential order (out-of order). Instruction fetch unit 10 also includes a branch prediction unit 110 that predicts whether branch instructions are taken or not and/or the target address (TA) (or fall-through address (FA)), generally "predicted data". Further detail regarding branch prediction unit 100 can be found in co-pending application Ser. No. 09/005,076, entitled Method and Apparatus for Performing Multiple Branch Predictions per Cycle, filed on Jan. 9, 1998, and assigned to the same assignee. Application Ser. No. 09/005, 076 is herein by incorporated by reference for all purposes. In response to these branch predictions, instruction fetch unit 10 fetches instructions according to the predicted branch or the predicted TA.

In response to the instructions fetched from instruction fetch unit 10, decoding unit 20 decodes the fetched instructions. These decoded instructions are then passed to execution unit 30, that is preferably a pipelined execution unit.

Execution unit 30 has an associated CIW 110 that typically stores portions of instructions from decoding unit 20 that are currently being executed in execution unit 30. Because execution unit 30 is typically a pipelined unit, instructions stored within CIW 110, including predicted branch instructions, are typically in different stages of execution at any one time.

Generally, BRT 90 stores unresolved branch instruction related data. Specifically, BRT 90 typically stores "predicted" data from decoding unit 20 as well as historical state information from instruction fetch unit 10 and decoding unit 20. Further details regarding the operation of BRT 90 are discussed in conjunction with FIG. 2.

Upon successful completion of execution of typical instructions within CIW 110, instructions are retired. Retirement unit 40 uses retirement pointer 120 to point to the next sequential instruction to retire. Although instructions within CIW 110 may be completed at different times, for example instructions arriving later than earlier instructions may complete earlier, instructions are typically retired in a top-down, sequential approach in CIW 110. Typically, retirement of an instruction occurs by indicating so in a retirement field in that instruction in CIW 110.

BEUs 50–80 preferably determine whether branches of branch instructions are taken or not taken, and/or the actual TAs. BRT 90 is then used, before retirement of the branch instructions, to compare the "actual" data or results to the predicted data stored within BRT 90. In the present embodiment, BRT 90 includes four comparators to perform the comparison functions.

BRT 90 provides repair information to instruction fetch unit 10 and decoding unit 20 when there is a branch misprediction. Since there are multiple BEUs, more than one predicted branch instruction may be executed during a single clock cycle. Further since there are typically multiple comparators within BRT 90, multiple branches may be also resolved in the same clock cycle. In alternative embodiments of the present invention, a greater or lesser number of BEUs and comparators may be used.

The above system is preferably embodied in a SPARC microprocessor, currently being developed by Sun Microsystems, Incorporated. In the preferred embodiment, CIW is on the order of 128 rows by 260 bits wide, and BRT is on the order of 32 rows by 210 bits. Alternative arrangements and word width and word depth for the CIW and BRT are envisioned in alternative embodiments of the present invention.

Figure 2:
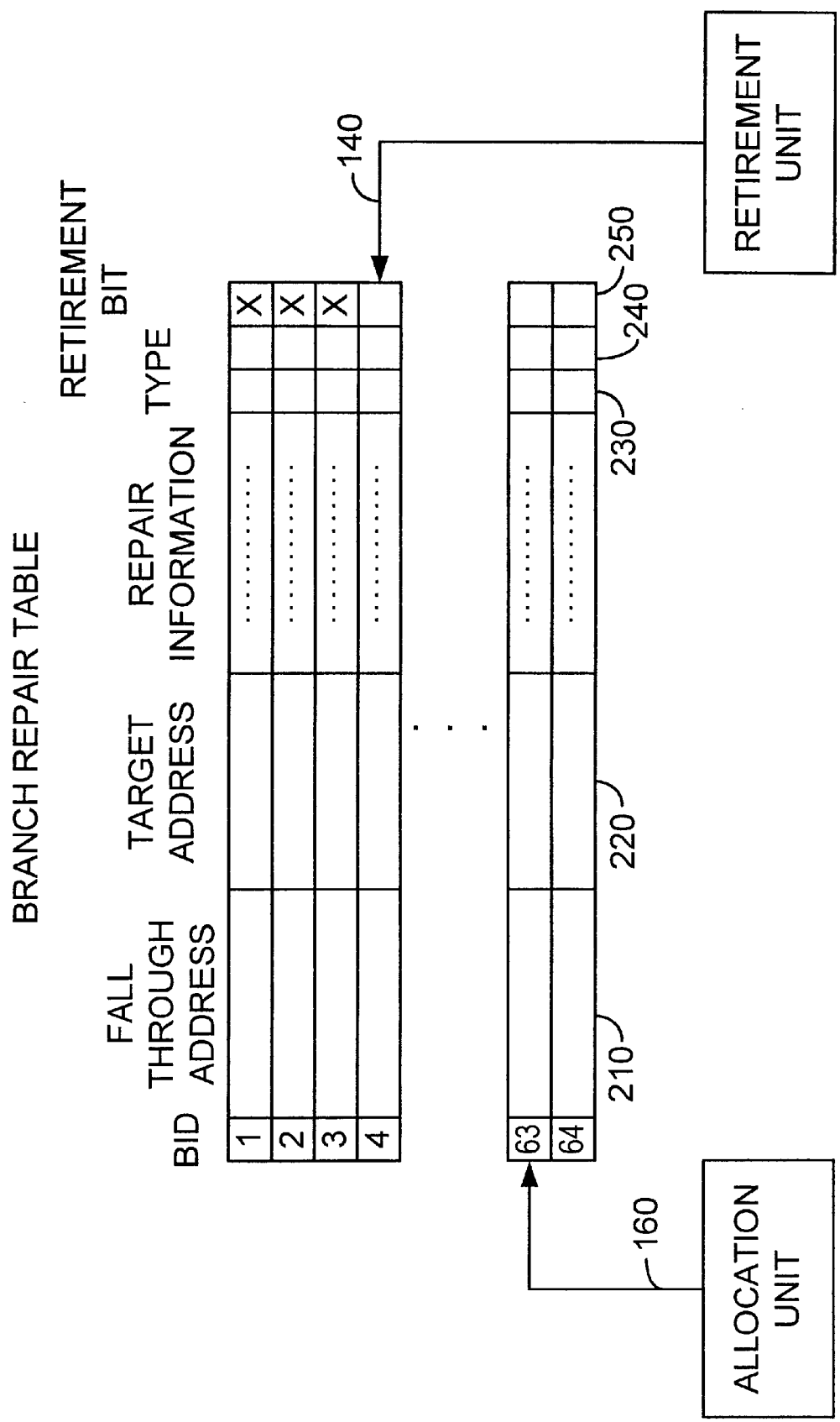
FIG. 2 illustrates a more detailed diagram of a BRT in FIG. 1 in a preferred embodiment of the present invention.

FIG. 2 illustrates a more detailed diagram of BRT 90 in FIG. 1 in a preferred embodiment of the present invention. BRT 90 typically includes rows of data, with each row corresponding to a branch instruction.

As shown in this embodiment, BRT 90 includes a portion 210 for storing a fall-through address (FA) and a portion 220 for storing a target address (TA) both preferably 62 bits wide. The width of FA and TA in the present invention are preferably equal to the width of addresses used to reference an instruction cache (ICache). TA is typically provided when a branch of a branch instruction is to be taken.

The type of branch instruction is indicated by data stored in portion 230. In the preferred embodiment this portion is three bits wide thus provides for up to eight different branch types. For example, call branch, return, jump, and other types of well known conditional branch types. Other types of branches are included in alternative embodiments. BRT 90 also includes a portion 240, for indicating whether the branch was taken or not taken.

An embodiment of the present invention, implemented on a SPARC processor includes a portion 250 for storing an annul bit. The annul bit is a SPARC instruction set architecture (ISA) specific bit that indicates annulling of the next sequential instruction after the branch. Another portion stores SPARC ISA register window state data.

For repair purposes, BRT 90 also includes a portion for storing a delay slot valid bit (DSI) bit used for facilitating issuing of the next sequential instruction; and a portion for storing a pointer to the top of a return address stack (RAS) used to restore the state of the RAS upon a branch mispredict. Preferably, to restore the state of the branch prediction tables and BPU 100, BRT 90 also includes a portion for storing global history register data for, a portion for storing a branch local history data when the branch was predicted, and a portion for storing a branch index (pointer) to the branch history table.

In alternative embodiments of the present invention, inclusion of other processor specific bits, data, and repair data is contemplated. Thus, adding more data or removing data from BRT 90 based upon specific processor implementation and requirements is clearly within the scope of embodiments of the present invention.

As is illustrated in FIGS. 1 and 2, BRT 90 is referenced by two pointers, retirement pointer 140 and allocation pointer 160. Retirement pointer 140 is typically used to identify a branch instruction that has been correctly predicted, executed, and retired from CIW 110. The entry in BRT 90 can then be allocated for new incoming branches, since the BRT is preferably organized as a FIFO stack, where entries can be reused. As discussed in conjunction with retirement pointer 120, above, retirement pointer 140 typically retires branch instructions from BRT 90 in a top-down sequential order.

Allocation pointer 160 is typically used to identify locations within BRT 90 where the next branch instruction from CIW 110 may be stored, i.e. the next free row. Typically upon entry of a new branch instruction, allocation pointer 160 will be incremented and point to the next row. However, as will be discussed below, in certain circumstances, allocation pointer 160 may move up the list and over write previous branch instructions rows. For example, if allocation pointer 160 refers to the eighth row, upon a branch prediction error involving the branch instruction of the sixth row, the allocation pointer will preferably be modified to refer to the seventh row. CIW 110 preferably also includes a similar allocation pointer.

Branches in the preferred embodiment are typically classified as being conditional (pc-relative) or unconditional (register-indirect) branches. With conditional branches, branch prediction unit 100 typically predicts whether the branch will be taken or not. These TAs may be known, or be predicted. With unconditional branches, the branch is known to be taken and branch prediction unit 100 typically predicts what TA is required. In an alternative case, the TA may be known. In the preferred embodiment of the present invention, FAs are assumed to be primarily known, whereas TAs may or may not be known. In alternative embodiments, this situation may be reversed or combined in different ways.

Figure 3:
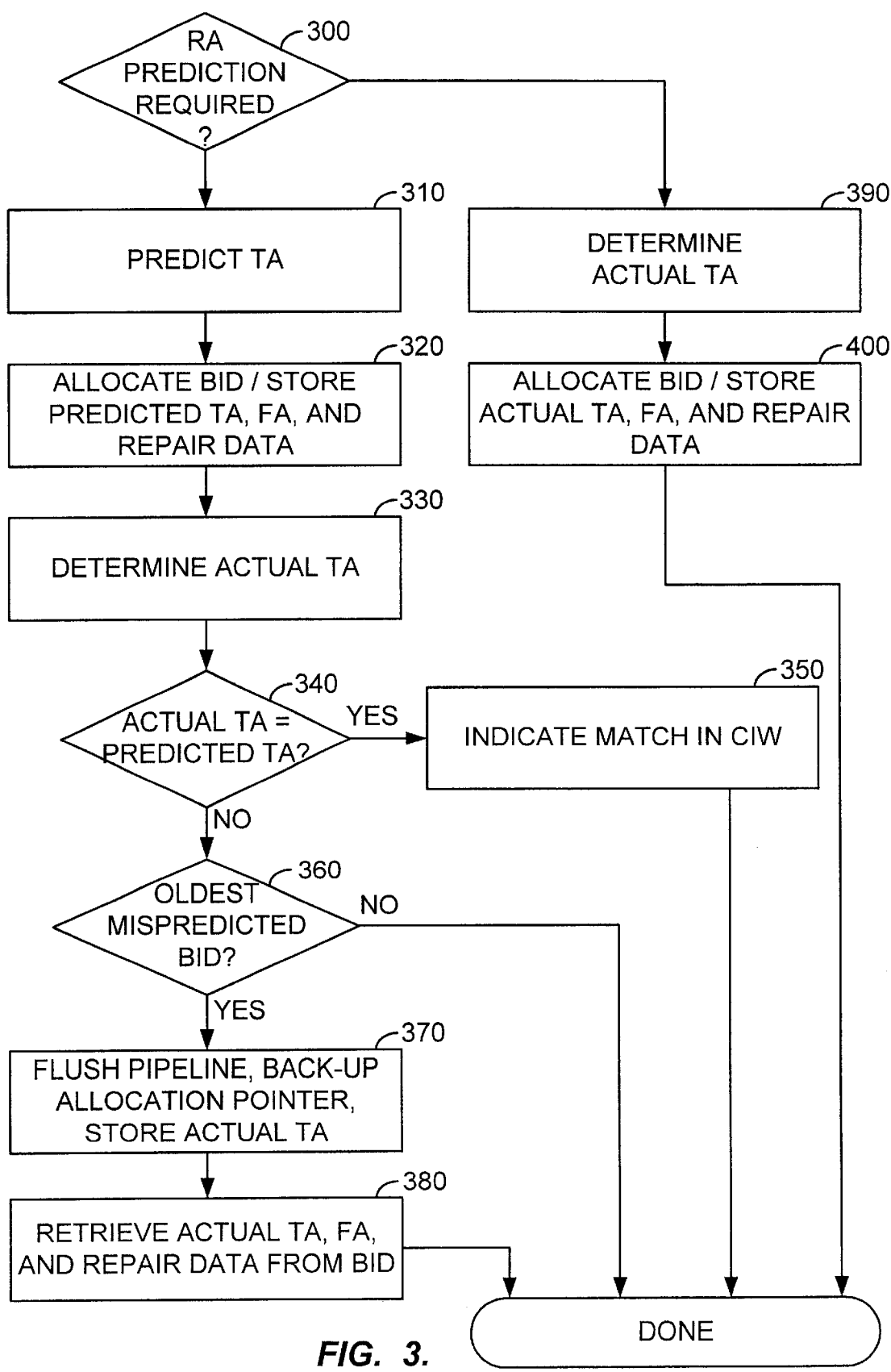
FIG. 3 illustrates a block diagram of a flow chart according to an embodiment of the present invention.

FIG. 3 illustrates a block diagram of a flow chart according to an embodiment of the present invention. FIG. 3 illustrates a situation where the branch is unconditional, but the TA is initially unknown. FIG. 3 includes steps 300–400.

Initially, it is determined whether a TA needs to be predicted for a particular branch instruction, step 300. In a particular embodiment, TA is predicted when the branch instruction does not include a program counter (PC) relative address. If a TA needs to be predicted, branch prediction unit 100 determines a predicted TA, step 310. In particular, a Next Fetch Address Table (NFAT) and a Return Address Stack (RAS) within branch prediction unit 100 are used to predict the TA. Next, a row in BRT 90 is allocated and data such as the predicted TA, the FA, and other data described above, are stored in that row, step 320. The row is typically identified and referenced with a Branch Identification (BID).

After execution of the branch instruction within BEU 50, for example, the actual TA is determined for the particular branch instruction, step 330. Next, the actual TA and the predicted TA from the row in BRT 90 are compared, step 340.

If the actual TA and the predicted TA are the same, the executed particular branch instruction in BEU 50 is correct. Further, a field within CIW 110 associated with that particular branch instruction is toggled to indicate that the particular branch instruction is correct, step 350.

If the actual TA and the predicted TA are not the same, the executed branch instruction in BEU 50 is not correct. If the particular branch instruction is the "oldest" mispredicted branch instruction, among the mispredicted branch instructions resolved by BRT 90 within this clock cycle, step 360, instructions in the pipeline after the particular branch instruction are flushed, and allocation pointer 160 is backed-up to the row after the particular branch instruction, step 370. The actual TA is also typically stored in the BRT 90 in this step. Next, the actual TA, is used to fetch the appropriate instruction within the ICache, and other restore data stored in BRT 90, such as restoring the top of the RAS, is provided to restore the state of the machine, step 380.

In the case where prediction of the TA is not required, the actual TA is first determined, step 390. In a particular embodiment, the NFAT and an Branch Address Calculator (BAC) in branch prediction unit 100 are used to determine the actual TA. Next, a row in BRT 90 is allocated and data such as the actual TA, the FA, and other data described above, are stored in that row, step 400. In this situation, the actual TA is known, thus no comparison step, such as step 340 is typically required. Further information regarding the NFAT, RAS, and BAC are described in the cited co-pending application.

Figure 4:
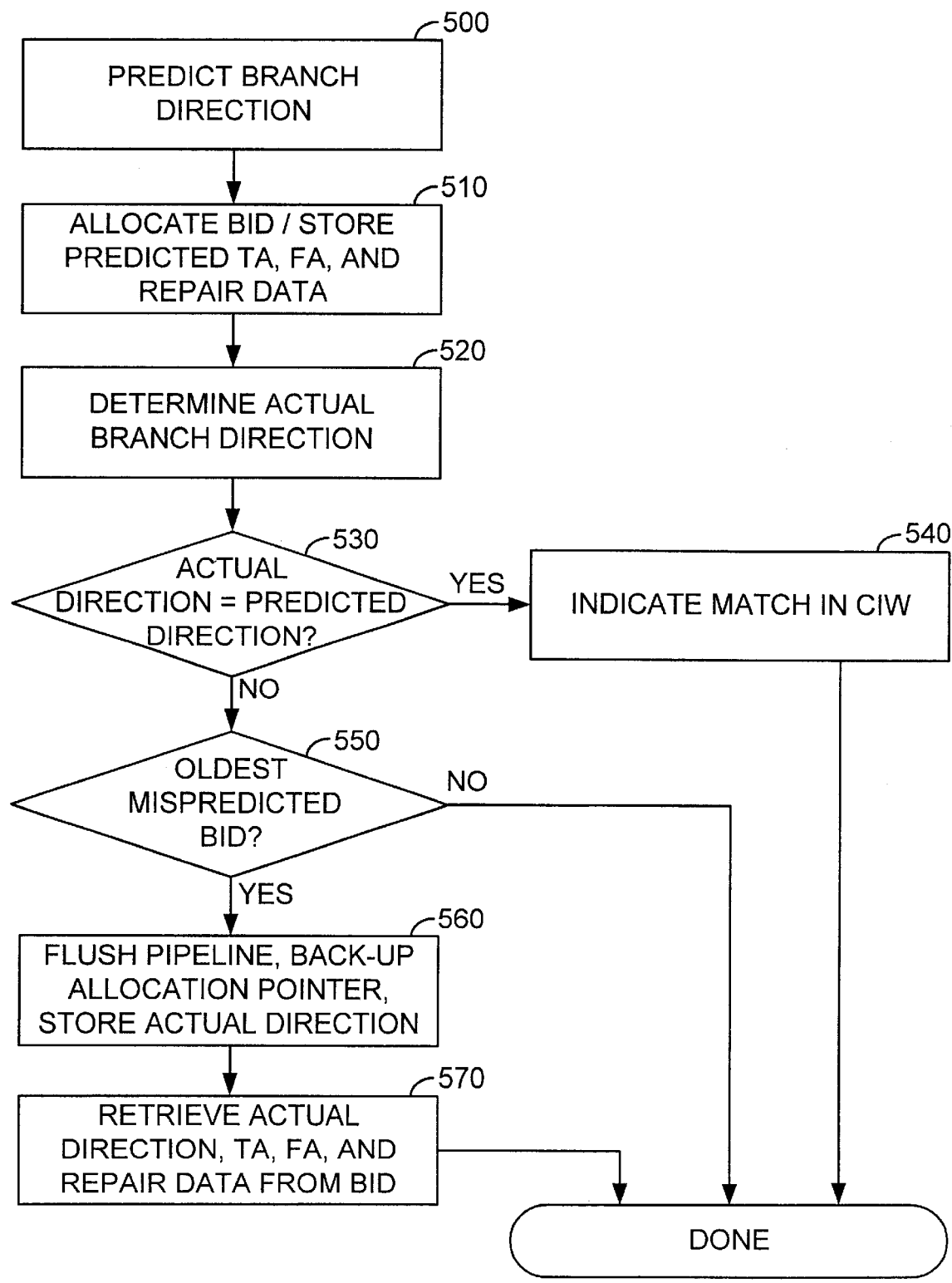
FIG. 4 illustrates a block diagram of a flow chart according to another embodiment of the present invention.

FIG. 4 illustrates a block diagram of a flow chart according to another embodiment of the present invention. FIG. 4 illustrates a situation where the branch is conditional, and the TA is known. FIG. 4 includes steps 500–570.

Initially, a predicted direction (taken/not taken) and a TA (and/or FA) are determined for a particular branch instruction, step 500. In a particular embodiment, the Branch Prediction Unit (BPU), Branch Address Calculator (BAC) and NFAT in branch prediction unit 100 are used to predict the direction and the actual TA, respectively. Next, a row in BRT 90 is allocated and data such as the TA, the FA, the predicted direction, and other data described above, are stored in that row, step 510. The row is typically identified and referenced with a Branch Identification (BID).

After execution of the branch instruction within BEU 50, for example, the actual direction (taken/not taken) of the branch instruction is determined, step 520. Next, the actual direction and the predicted direction from the row in BRT 90 are compared, step 530. If the actual direction and the predicted direction are the same, the executed particular branch instruction in BEU 50 is correct. Further, a field within CIW 110 associated with that particular branch instruction is toggled to indicate that the particular branch instruction is correct, step 540.

If the actual direction and the predicted direction are not the same, the particular branch instruction in BEU 50 is not correct. If the particular branch instruction is the "oldest" mispredicted branch instruction, among the mispredicted branch instructions resolved by BRT 90 within this clock cycle, step 360, step 550, instructions in the pipeline after the particular branch instruction are flushed, and allocation pointer 160 is backed-up to the row after the particular branch instruction, step 560. The actual branch direction, TA, and FA are also typically stored in BRT 90 in this step. Next, the actual direction, the TA, the FA, and other restore data stored in BRT 90 is provided to restore the state of the machine, step 570.

The flow charts in FIGS. 3 and 4 may be combined advantageously in the case where there is a conditional branch with a predicted TA, or when both conditional and unconditional branches are resolved within the same clock cycle.

Figure 5:
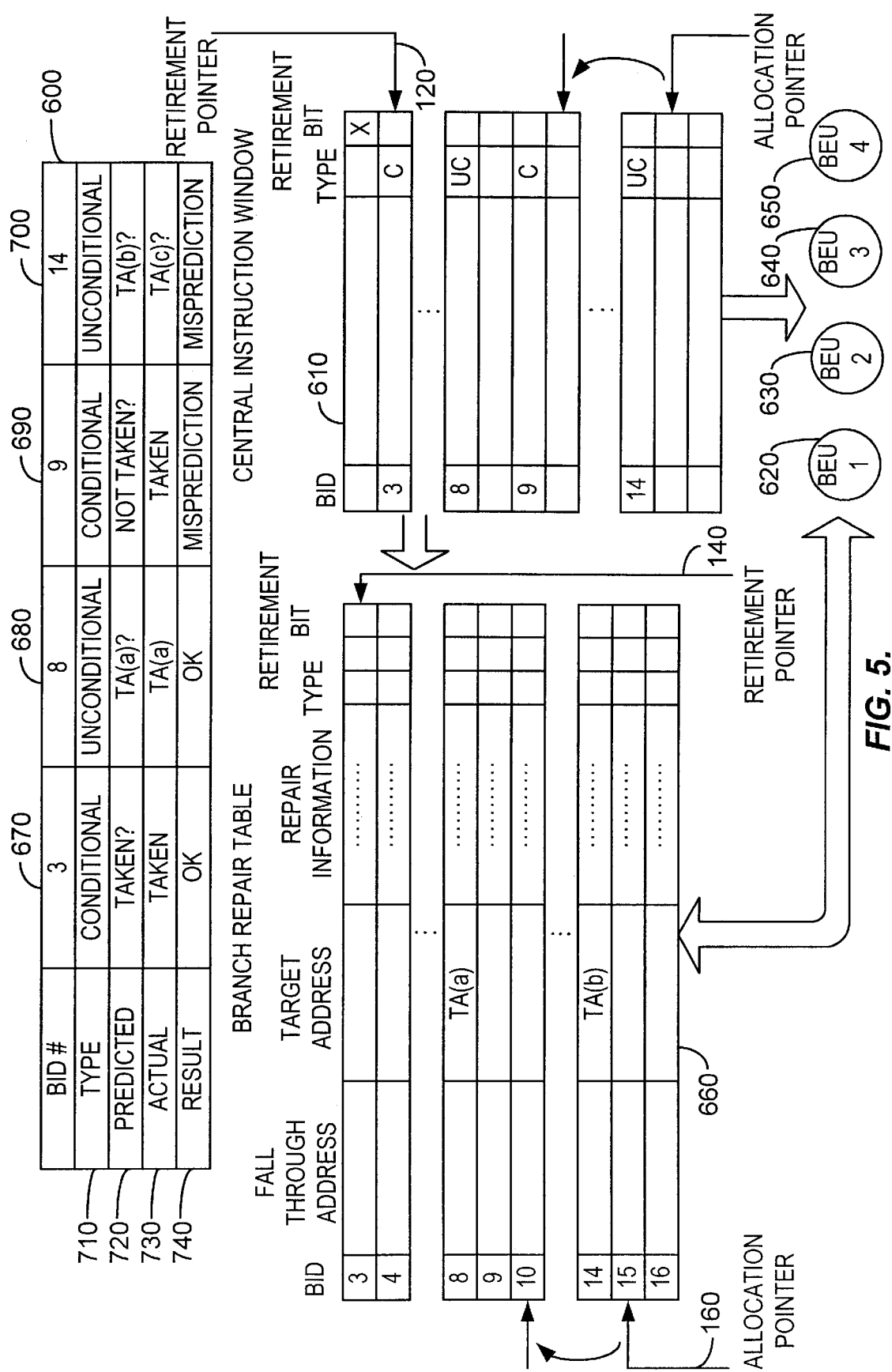
FIG. 5 illustrates an example of an embodiment of the present invention.

FIG. 5 illustrates an example of an embodiment of the present invention. FIG. 5 includes a conceptual table 600, a portion of a CIW 610 including an allocation pointer as shown, a plurality of branch instruction units (BEUs) 620–650, and a portion of a BRT 660 including an allocation pointer as shown.

In the preferred embodiment of the present invention CIW 610 includes 128 rows whereas BRT 660 includes 32 rows. This represents a 25% relationship between the BRT 660 and CIW 610, although other percentages are contemplated. Having fewer rows in BRT 660 tends to limit the number of branch instructions that may simultaneously be within CIW 610, whereas having a larger number of rows in BRT 660 increases hardware and real estate costs within a processor.

In conceptual table 600, four branch instructions are resolved in a single clock cycle, in particular instructions having the listed branch identifiers (BIDs) 670–700. Conceptual table 600 includes a first row 710 indicating the "type" of the branch condition, in particular "conditional" or "unconditional" as discussed above. As is illustrated branch instructions 670 and 690 (BID 3 and BID 9) are conditional branches, and branch instructions 680 and 700 (BID 8 and BID 14) are unconditional branches.

Conceptual table 600 also includes a second row 720 indicating the predicted branch direction or the predicted TA. As is illustrated, BID 3 and BID 9 are predicted to be taken and not taken, respectively, and BID 8 and BID 14 are predicted to have a TA of $TA_A$ and $TA_B$, respectively.

Upon execution of the branch identified by BID 3 in BEU 620, the branch identified by BID 8 in BEU 630, the branch identified by BID 9 in BEU 640, and the branch identified by BID 14 in BEU 650, the actual data for these branch instructions are determined. The actual branch direction or the actual TA are illustrated in a third row 730 of conceptual table 600. In this example, the actual branch directions of BID 3 and BID 9 are "taken". Further, the actual TAs of BID 8 and BID 14 are $TA_A$ and $TA_C$, respectively.

Fourth row 740 of conceptual table 600 illustrates the results of the predicted branch instructions to the actual branch instructions. As shown, BID 3 had a predicted direction of taken, and an actual direction of taken, thus the prediction was accurate; BID 8 had a predicted TA of $TA_A$, and an actual TA of $TA_A$, thus the prediction was also accurate; BID 9 had a predicted direction of not taken, and an actual direction of taken, thus the prediction was wrong; and BID 14 had a predicted TA of $TA_B$, and an actual TA of $TA_C$, thus the prediction was also wrong.

In this example, branch instructions corresponding to BID 9 and BID 14 are thus mispredicted. Thus, according to the flow charts described in conjunction with FIGS. 3 and 4, the oldest mispredicted branch instruction is repaired, BID 9, and the younger branch instructions, BID 10 and later, are ignored.

In response to the misprediction of BID 9, the allocation pointer associated with CIW 600 is backed up from the original location to the location after the branch instruction corresponding to BID 9; further, the row in BRT 660 corresponding to BID 9 is updated with the actual direction: "taken"; repair data stored in BID 9 of BRT 660 is output to other parts of the processor, as previously described, and the allocation pointer associated with BRT 660 is backed up from the original location to BID 10. Note that branch instructions BID 10, BID 11, BID 12, etc. are thus overwritable by new branch instructions.

It should be understood that conceptual table 600 is merely used in this example to illustrate the present example. Such a table may or may not actually exist or be used in the embodiments of the present invention.

In this example, since the branch instruction corresponding to BID 3 was correctly predicted, the branch instruction is executed, and retired. As illustrated in FIG. 5, when the branch instruction is retired, a retirement pointer, toggles a retirement bit within CIW 610, and increments to the next instruction. Further, the retirement pointer associated with BRT 660 is also incremented to BID 4 and the architecture of the PC register is updated by BRT 660.

Conclusion

In the foregoing specification, the invention has been described with reference to specific exemplary embodiments thereof. Many changes or modifications are readily envisioned, for example, the described embodiment includes four branch execution units (BEUs), although any arbitrary number of BEUs can be used. In the presently described embodiments up to four branch instructions can be executed in the same clock cycle. Further, the number of comparators within the BRT can be greater or fewer than the number illustrated above. Thus, in alternative embodiments, fewer than four or more than four branch instructions can be executed and resolved simultaneously. In another modification, the number of rows in the BRT and in the CIW can be varied and optimized for performance purposes, etc. Further, in alternative modifications, the width of a word in the BRT may be increased to contain greater or fewer repair and status parameters, than the parameters described above.

Embodiments are described in terms of a specific processor, a SPARC processor, however, it should be clearly understood that BRTs as described above may be advantageously applied to other processors and to other processor architectures. Further many apparatus incorporating embodiments of the present invention are anticipated, for example, workstations, network PCs, consumer appliances, programmable devices, communication devices, etc.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A processor includes:

a central instruction window having a first plurality of entries, the entries in the first plurality of entries having a first bit width; and a branch repair table coupled to the central instruction window, the branch repair table including a second plurality of entries, the entries in the second plurality of entries having a second bit width, the first bit width greater than the second bit width, an entry of the second plurality of entries in the branch repair table including:

a first portion for storing a branch identifier;

a second portion for storing a fall-through address associated with a branch instruction; and a third portion for storing a target address associated with the branch instruction.

2. The processor of claim 1 wherein the branch repair table also includes a fourth portion for storing a branch type for the branch instruction.

3. The processor of claim 2 wherein the branch type is selected from a class comprising a conditional-type and an unconditional-type.

4. The processor of claim 3 wherein the target address is a predicted target address when the branch type is the unconditional type.

5. The processor of claim 3 wherein the first plurality of entries is greater than the second plurality of entries.

6. The processor of claim 1 wherein the branch repair table also includes a fourth portion for storing repair data for the processor.

7. A microprocessor for executing instructions out of order, comprising:
- a branch repair table for storing data related to a branch instructions, the branch repair table including a first plurality of entries, at least one entry of the first plurality of entries having a first portion for storing a target address of the branch instruction and a second portion for storing a fall-through address for the branch instruction, the branch repair table having a first bit width; and
- a pipelined execution unit having an associated central instruction window, the central instruction window including a second plurality of entries for storing instructions including the branch instructions and a reference to at least the one entry in the first plurality of entries, the second plurality of entries less than the first plurality of entries, the associated central instruction window having a second bit width, the first bit width lesser than the second bit width.

8. The microprocessor of claim 7 wherein the one entry of the first plurality of entries includes repair data for the branch instruction.

9. The microprocessor of claim 7 further comprising:
- an allocate pointer for pointing to an entry in the first plurality of entries, the entry after the one entry.

10. The microprocessor of claim 7 wherein the pipelined execution unit includes a branch execution unit for executing the branch instruction and for returning an actual target address and for comparing the actual target address to the target address of the branch instruction.

11. The microprocessor of claim 10 wherein the execution unit includes a branch execution unit for determining whether a branch of the branch instruction should be taken, the microprocessor further comprising:
- a branch repair unit for repairing the pipelined execution unit in response to the repair data.

12. The microprocessor of claim 10 further comprising a branch repair table updater for updating the one entry with the actual target address.

13. The microprocessor of claim 10 further comprising an allocation pointer unit for moving the allocation pointer from the one entry to the entry after the target address and the fall-through address are stored in the one entry.

14. The microprocessor of claim 7 further comprising a retirement pointer for pointing to an entry in the first plurality of entries, the entry before the one entry and the entry associated with another branch instruction.

15. The microprocessor of claim 14 further comprising a retirement pointer unit for moving the retirement pointer from the entry to the one entry after the another branch instruction associated with the entry has been successfully executed.

16. A method for repairing a pipeline in response to a branch instruction, comprising the steps of:
- storing the branch instruction in a central instruction window, the central instruction window comprising a storage having a width of a first number of bits;
- providing a branch repair table having a plurality of entries, the branch repair table having a width of a second number of bits, the second number lesser than the first number;
- predicting a target address for the branch instruction;
- allocating an entry in the branch repair table for the branch instruction;
- storing the predicted target address, fall-through address, and repair information in the entry in the branch repair table;
- processing the branch instruction to determine an actual target address;
- comparing the predicted target address to the actual target address; and
- repairing the pipeline in response to the repair information in the entry in the branch repair table in response to the predicted target address and the actual target address being different.

17. The method of claim 16 wherein the step of storing further comprises the step of storing a type for the branch instruction in the entry in the branch repair table.

18. The method of claim 16 wherein the step of processing the branch instruction comprises executing the branch instruction.

19. The method of claim 16 further comprising the step of updating the entry with the actual target address.

20. The method of claim 16 further comprising the step of retiring the entry in the branch repair table in response to the predicted target address and the actual target address being the same.

* * * * *